United States Patent [19]
Dasgupta et al.

[11] Patent Number: 6,159,635
[45] Date of Patent: Dec. 12, 2000

[54] COMPOSITE ELECTRODE INCLUDING CURRENT COLLECTOR

[75] Inventors: Sankar Dasgupta; James K. Jacobs, both of Toronto, Canada

[73] Assignee: Electrofuel Inc., Toronto, Canada

[21] Appl. No.: 09/161,664

[22] Filed: Sep. 29, 1998

[51] Int. Cl.[7] .............................. H01M 4/62; H01M 10/50
[52] U.S. Cl. .............................. 429/216; 429/61; 429/62; 429/232
[58] Field of Search .............................. 429/61, 62, 216, 429/232

[56] References Cited

U.S. PATENT DOCUMENTS

| | | | |
|---|---|---|---|
| 3,793,716 | 2/1974 | Smith-Johannsen | 29/611 |
| 4,237,441 | 12/1980 | van Konynenburg et al. | 338/22 R |
| 4,957,612 | 9/1990 | Stewart et al. | 204/196 |
| 5,262,254 | 11/1993 | Koksbang et al. | 429/192 |
| 5,441,830 | 8/1995 | Moulton et al. | 429/212 |
| 5,464,706 | 11/1995 | Dasgupta et al. | 429/194 |
| 5,464,707 | 11/1995 | Moulton et al. | 429/212 |
| 5,547,782 | 8/1996 | Dasgupta et al. | 429/194 |
| 5,554,459 | 9/1996 | Gozdz et al. | 429/194 |
| 5,728,181 | 3/1998 | Jung et al. | 29/623.5 |
| 5,793,276 | 8/1998 | Tosaka et al. | 338/22 R |
| 5,968,419 | 10/1999 | Sadhir et al. | 252/512 |

FOREIGN PATENT DOCUMENTS

| | | | |
|---|---|---|---|
| 851 517 A1 | 7/1998 | European Pat. Off. | H01M 4/62 |
| 10-125353 | 5/1998 | Japan | H01M 10/40 |

*Primary Examiner*—Carol Chaney

[57] ABSTRACT

A composite electrode for a rechargeable lithium battery is described. The composite electrode has a metallic current collector in contact with an electrically conducting organic polymer laminate made of a blended and annealed polymeric mixture containing fine carbon particles, and coated with an electrode-active substance bearing layer. The conducting polymer is capable of reversible resistivity changes of several orders of magnitude in only a portion of the laminate, thereby reducing locally excessive current flow and over-heating in the rechargeable lithium battery.

17 Claims, 1 Drawing Sheet

COMPOSITE ELECTRODE INCLUDING CURRENT COLLECTOR

FIELD OF INVENTION

This invention is related to lithium batteries, in particular to current collectors utilized in rechargeable lithium batteries and electrochemical cells.

BACKGROUND OF THE INVENTION

Lithium batteries are often utilized in systems where high energy density per volume or weight is desirable. Lithium batteries or cells may be button shaped, cylindrically or prismatically wound, or flat, composed of layers, known as planar cells or planar batteries. In most instances lithium based electrochemical cells are rechargeable, or are referred to as secondary batteries. Lithium electrochemical cells or batteries include a negative electrode or anode, containing a substance capable of intercalating lithium, or lithium metal or an alloy of lithium, as the negative active component. The positive active component in the cathode is usually a chalcogenide of a transition metal and lithium, such as lithium-manganese oxide, lithium-cobalt oxide and similar type of compounds. The non-aqueous electrolyte may be a porous separator impregnated with an organic liquid containing a dissolved lithium salt, or a solid polymer containing a dissociable lithium compound, or composed of particles of solid polymer containing dissociable lithium compounds which particles are intermixed with one of the electrode active compound containing particles. Lithium batteries are usually equipped with current collectors in close proximity of the electrodes, which can be a metallic plate, rod, grating or foil, most frequently made of copper or aluminum, or similar metals or alloys thereof. The packaging of thin plate lithium cells often utilize metallic foils carried by a polymeric laminate, in addition to other polymeric layers designed to protect the rechargeable lithium battery from corrosion and mechanical damage. It is noted that the packaging polymeric laminate carrying metallic foil is an insulator and is usually impermeable to liquids and gases. The lithium batteries under consideration may be composed of a single rechargeable lithium electrochemical cell or several rechargeable lithium cells stacked, folded or interconnected in a known manner to make up a lithium battery.

It is of importance that good contact is maintained between the current collector and the respective electrode so that the energy the lithium battery is capable of delivering is maximized under normal conditions. There are known methods to improve electrical contact between the cell electrode and the internal surface of the current collector. One of such methods is designed to eliminate or reduce oxide formation on the surface of the metallic current collector. In another method a conductive polymeric layer is inserted between the current collector and the electrode. By way of examples, a few patents which are directed to conductive polymeric layers, are discussed below. U.S. Pat. No. 5,262,254 issued to Koksbang et al. teaches an electronically conductive polymeric layer which can protect the metallic collector from attack by the cell electrolyte. U.S. Pat. Nos. 5,441,830 and 5,464,707, issued to Moulton et al. on Aug. 15, 1995 and Nov. 7, 1995, respectively, discuss adhesion-promoting polymeric mixtures bearing fine carbon powder, which are coated on a metallic foil, or on a metallic layer supported by a polymer laminate, and then cured or dried. The electrode paste is deposited on the cured or dried adhesion promoting coating. U.S. Pat. Nos. 5,464,706 and 5,547,782, issued to Dasgupta et al. on Nov. 7, 1995 and Aug. 20, 1996, respectively, disclose conductive polymeric layers loaded with ceramic or carbon particles of certain particle size range, inserted to be in contact with the electrode and the metallic collector surface, with the objective to diminish corrosion. U.S. Pat. No. 5,554,459, issued to Gozdz et al. on Sept. 10, 1996, teaches cleaned collector elements, more specifically a metallic grid, coated with an adherent, carbon loaded, electrically conductive polymer composition. U.S. Pat. No. 5,728,181, issued to Jung et al. on Mar. 17, 1998, discloses a conductive ink composed of a long chained polymer and fine carbon coated on a current collector surface, onto which an electrode layer is subsequently deposited, and the two layers carried by the current collector are then bonded together by radiation or heat curing. However, the resistivity of the above discussed conductive polymeric layers is likely to change with temperature gradually, and temperature induced structural changes within the solid polymeric layers are not known to be reversible.

High temperatures within the battery may be caused by too high overall currents during charging or discharging, or it can arise in the course of normal battery operation, brought about by local irregularities in the interaction between the cell components. Moreover, localized short circuits can lead to high currents within only a small portion of the cell, thereby creating a notable increase of temperature in the neighbourhood of the trouble area or a hot spot in the battery. The locally high temperature can damage the electrolyte or reduce the porosity of the separator, thereby blocking irreversibly the passage of ions, generate harmful gases which may ultimately lead to explosion and fire, or otherwise affect the safe operation of the battery. If some means can be found to diminish the high local current and thus reduce the high local temperature, the battery may be able to continue to operate normally. It is noted that there are several known methods whereby externally installed fuses or switches can stop the battery charging or discharging process, should the current rise beyond a permitted level. Some such fuses are known to operate reversibly. However, such fuses are located in a circuit external of the battery, or are installed in series with the cells, and respond only to the total current drawn through the battery or the cell.

There are known electrically conducting, carbon bearing, blended polymeric compositions, which are capable of exhibiting resistivity changes amounting to several orders of magnitude in a reversible manner in a pre-selected, relatively narrow temperature range. Such compositions are taught, for example, in U.S. Pat. No. 3,793,716, issued to R. Smith-Johannsen on Feb. 26, 1974, and in U.S. Pat. No. 4,237,441, issued to P. van Konynenburg et al. on Dec. 2, 1980. Compositions of such type are utilized in self-limiting electrical heating elements, in heat activated switches comprising electrodes separated by a polymer having positive heat coefficient, in reversible fuses, and in similar devices. A particular application of conductive polymers is described in U.S. Pat. No. 4,957,612, issued to R. F. Stewart et al. on Sept. 18, 1990, wherein a metallic core of an electrode is coated with an electrically conductive polymer, which carries another conductive and electrochemically active component bearing polymer. The resistivities of the conductive polymers are different relative to one another at a given temperature.

There is a need for a thin conductive layer for insertion between the current collector and the electro-active layer in a rechargeable lithium battery, which is capable of reversible resistivity change of several orders of magnitude in response to locally high current flow and attendant local overheating within the battery, thereby being able to render protection from explosion and combustion.

SUMMARY OF THE INVENTION

An improved rechargeable lithium battery has been devised wherein an organic polymer laminate rendered electrically conductive by embedded electrically conductive particles, is forming a composite electrode in conjunction with an electrode layer containing an electrode-active substance, and a current collector. The electrically conductive organic polymer laminate has a thickness and faces which are in contact with the electrode layer and the current collector, respectively. The electrically conductive organic polymer laminate has a positive temperature coefficient of resistivity, a resistivity switch temperature $T_{rs}$, between 75 and 120° C., and the organic polymer laminate is capable of reversible resistivity change of at least 2 orders of magnitude within a 5° temperature band of the resistivity switch temperature $T_{rs}$ in a portion of the total volume of the electrically conductive organic polymer laminate. The electrically conductive particles embedded in the organic polymer laminate are very fine carbon particles or carbon black having particle size less than 0.1 μm.

In another embodiment the composite electrode including an electrically conductive organic polymer laminate, carries a lithium ion containing adhesive layer on the face adjacent the electrolyte in the rechargeable lithium battery.

Figure 1A:
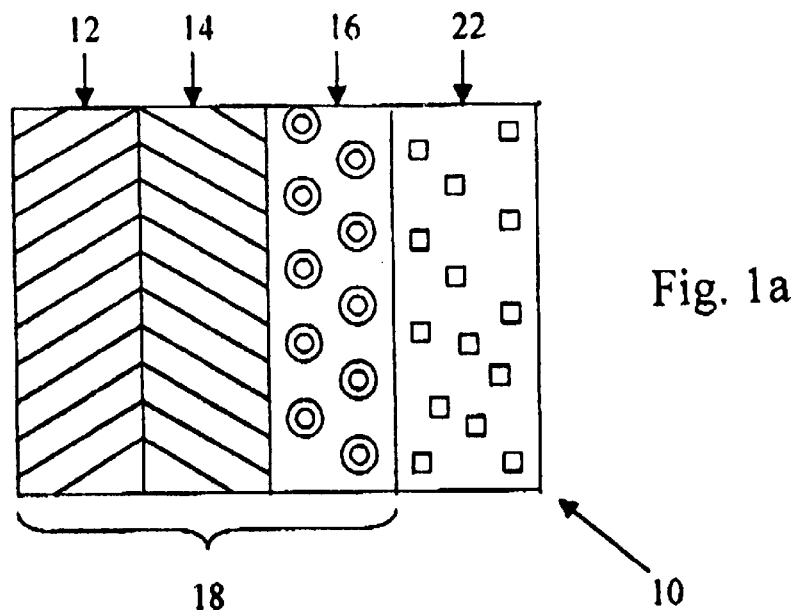
FIGS. 1a and 1b are schematic drawings of the cross-section of the composite electrode, and of a rechargeable lithium battery incorporating composite electrodes of the present invention.

The preferred embodiments of the invention with reference to the drawings and working examples will now be described.

DETAILED DISCUSSION OF THE PREFERRED EMBODIMENTS

For the sake of clarity, the meaning of some of the expressions in the present discussion, as they are understood, will be given below: An electrically conductive organic polymer is one wherein the charge carriers are electrons. Positive temperature coefficient of resistivity is understood to mean that the resistivity, measured in ohm.cm, of the polymeric laminates under consideration in this discussion, increases with temperature. The tangent drawn to the values of resistivity of a solid plotted against temperature, gives the temperature coefficient of resistivity. Resistivity switch temperature $T_{rs}$: the composition of the polymer laminates utilized in the present invention affects the nature of the electronic path and electronic mobility within the organic polymer laminate, such that the resistivity undergoes a rapid and substantial change around a given temperature. Below the resistivity switch temperature $T_{rs}$, the value of the resistivity in the polymer composition is a fraction of the resistivity above that temperature. The resistivity change with temperature is reversible.

As mentioned above, there are known polymer compositions having electrically conductive carbon particles dispersed therein, which are capable of undergoing a rapid and reversible change in resistivity with temperature. The type and mixture of polymers, the size and surface area of the carbon particles, the manner the particles are mixed with the polymers and the subsequent heat treatment, all have an effect on the value of the resistivity, and on the magnitude and temperature of the resistivity switch. It is noted that no invention per se, is claimed for the polymer compositions utilized in the improved rechargeable lithium battery of this invention. Most of the known carbon containing polymer compositions which have positive temperature coefficient of resistivity and are capable resistivity switch, utilize carbon particles of size less than 100 millimicron (mμ) or 0.1 μm.

It has also been briefly discussed that the usual fields of utilization of organic polymer compositions having positive temperature coefficient of resistivity, are heater tapes, heat sensitive electric switches, heat sensitive fuses and electrical devices of similar nature. In such devices, it is of importance that substantially the entire surface of the polymer making the desired contact within the device is close to the same temperature, that is the volume corresponding to the operative surface of the electrically conductive polymer has substantially similar values of resistivity.

It has now been found that when known polymer compositions capable of undergoing crystallinity changes between 70 and 120° C., are loaded with carbon black or similar very fine carbon, of particle size less than 0.1 μm, in concentrations less than 15 vol. %, blended, then heat treated or annealed in a known manner and laminated to sheets of less than 50 μm thick, then portions of the electrically conductive laminate obtained are capable of responding to local changes of temperature. If a portion of the laminate is at a temperature $T_1$, which is different from the temperature $T_2$ of the rest of laminate, then the resistivity of the laminate portion at $T_1$ will be different from the resistivity of the laminate portion at temperature $T_2$. When $T_1$ and $T_2$ fall in the temperature range the polymer composition of the laminate is undergoing a reversible crystallinity change, that is close to the resistivity switch temperature $T_{rs}$, then one portion of the electrically conductive polymer laminate can have a resistivity value which is several orders of magnitude different from the resistivity of the other portion. In other words, if a relatively small volume of the polymer laminate of such composition is heated to above its $T_{rs}$, the resistivity of this volume will increase very significantly, and when the temperature drops below the temperature referred to as $T_{rs}$, the lower resistivity is restored. It is believed, however, this reasoning is not considered binding, that the very small, less than 0.1 μm size of the carbon particles allows rapid rearrangement within the polymer laminate structure with temperature, thereby altering the path of the electronic charge carriers, which then results in substantial change in the resistivity of the polymer laminate. The crystallinity changes discussed above are the characteristic of certain polymer blend types, and are understood to be changes within a solid state taking place well below the melting temperature of the blend. Structural changes which are brought about by melting the polymeric mixture are excluded from the above considerations.

Rechargeable lithium batteries normally operate at temperatures below 70° C. If during discharging or charging, the current in the battery goes above the level which is acceptable in any of the components of the lithium battery, there are known external devices that stop the battery operation in the usual manner. If there is a local short circuit in the battery which can occur in an area of less than 50% of the electrode surface, or within the battery which is in contact with less than 50% of the electrode surface, more frequently with less than 15% of the electrode surface, the overall current drawn through the battery may not increase sufficiently to trigger the current interrupting device and the cell or the battery can become damaged. In extreme cases the damage may result in explosion and fire. In the presence of the electrically conductive organic polymer laminate utilized in the composite electrode of the present invention, a short circuit occurring within a relatively small volume of the battery can increase the resistivity of a small volume of the organic polymer laminate in the proximity of the short circuit, thereby reducing the corresponding flow of current, thus avoiding, or at least reducing possible damage taking place in the lithium electrochemical cell or battery.

The polymer laminates are made of known blended mixtures of polyethylene of different chain lengths, mixtures of polyethylene and copolymers of ethylene and ethyl acrylate, mixtures of polyethylene and copolymers of ethylene and acrylic acid, copolymers of ethylene and ethyl acrylate, copolymers of ethylene and acrylic acid, polyolefins, polyesters, polyamides, polyethers, fluorinated ethylene-propylene copolymer, polyvinylidene fluoride and chemical equivalents, and contain carbon black or fine carbon of particle size less than 1 $\mu$m, in less than 15 vol. %. The polymeric blend and carbon containing mixture is usually annealed in a known manner, and subsequently laminated. The preferred laminate thickness is less than 50 $\mu$m but more than 4 $\mu$m, dictated by requirements of mechanical strength only. The above listed blended polymer mixtures have melting temperatures at least 50° C. higher than their resistivity switch temperature $T_{rs}$. The obtained electrically conductive polymer laminates are cut to sizes which generally correspond to the appropriate lithium battery current collector. The carbon containing organic polymer laminate is placed over at least one the face of current collector, and an electrode layer containing an electrode-active substance is deposited over the free face of the electrically conductive polymer laminate. The electrode-active substance may be a conventional negative-active material in the case of the composite electrode being the anode, or a conventional positive-active substance for providing a composite cathode. The anode or negative-active substance may be carbon particles capable of intercalating lithium, or a transition metal oxide, or a foil of lithium metal or an alloy thereof. It is known that lithium metal or alloy may form dendrites in the recharging process which may lead to hot spots or short circuits in the lithium battery. The present invention is particularly suitable to overcome the problems created by lithium metal dendrites. The cathode or positive-active substance may be a lithium-transition metal oxide or a similar compound capable of performing the same function. In the instance of utilizing conventional particulate electrode-active substances, such are mixed with a binder material, usually some fine carbon is also added to increase the conductivity of the mixture, and the electrode-active substance containing paste is laid in a suitable thickness over the conductive organic polymer laminate to yield a composite electrode for a rechargeable lithium battery.

The composite electrode is subsequently brought in contact with a conventional lithium ion conducting electrolyte. The electrolyte may be a solid polymer electrolyte having dissociable lithium ions, or a porous separator layer impregnated with a lithium salt containing non-aqueous liquid, or similar substances utilized as electrolytes in lithium batteries. The other electrode of the rechargeable lithium battery may be another composite electrode of the present invention, or it may be a conventional lithium battery electrode.

In another arrangement the electrically conductive organic polymer laminate is covering both faces of the metallic current collector, and subsequently the electrode-active layer is deposited over both free faces of the conductive organic polymer laminate, thereby forming a double sided composite electrode.

In another embodiment the composite electrode has an additional adhesive layer between the electrode layer containing the electrode-active substance and the lithium ion conducting electrolyte. The object of the adhesive layer is to provide a medium for the lithium ions to transgress between the electrolyte and the electrode, as well as to eliminate possible trapping of gases between the electrode layer and the electrolyte layer. The adhesive layer usually comprises a non-aqueous solvent containing a lithium salt in a concentration which is less than concentration of lithium ions present in the electrolyte. There are known methods for applying such adhesive layers.

Figure 1B:
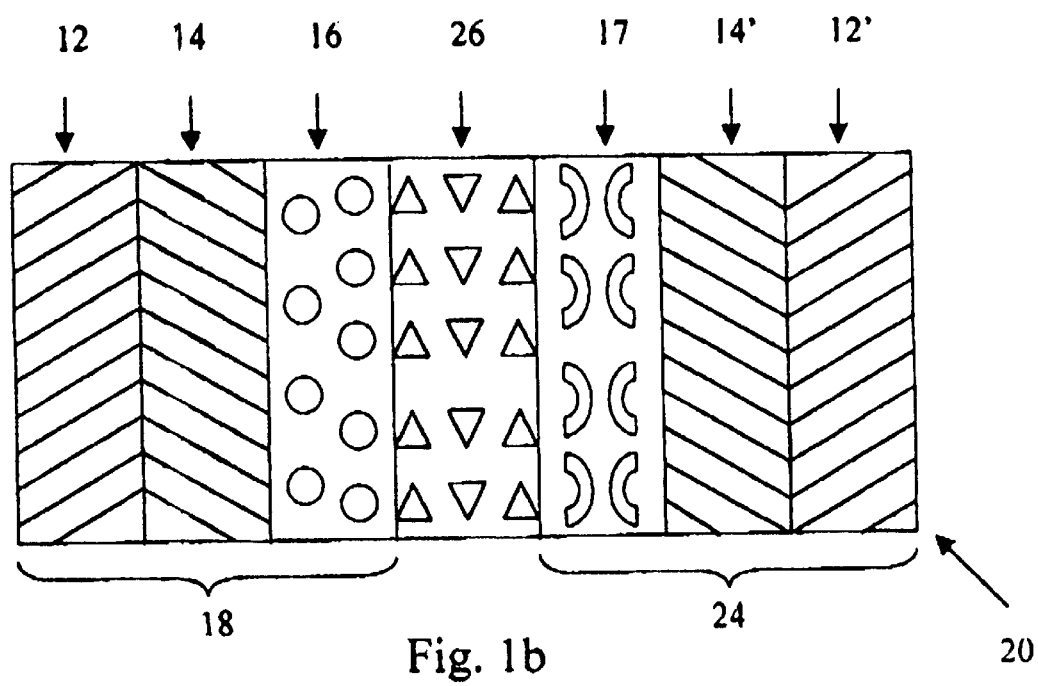

A composite electrode, and a lithium battery having electrodes of opposite polarity both in the form of composite electrode made in accordance with this invention, are schematically represented on FIG. 1a and FIG. 1b. FIG. 1a shows a composite electrode 10, assembled according to this invention, where 12 is the metallic current collector, 14 is the electrically conductive organic polymer laminate, and 16 is the electrode-active substance containing layer. Reference numeral 18 represents the assembled composite electrode, which may optionally, carry a lithium ion bearing adhesive layer 22. FIG. 1b represents schematically a lithium electrochemical cell 20, made of two composite electrodes of opposite polarity, and having electrolyte layer 26 between the composite anode 18, and composite cathode 24. In FIG. 1b 12 and 12' are metallic current collector sheets, 14 and 14' are the electrically conductive organic polymer layers, which may be of the same composition or may be different, and 16 and 17 represent layers containing electrode-active components of opposite polarity. Lithium ion containing adhesive layers (not shown) may be inserted between each composite electrode and the appropriate face of the non-aqueous electrolyte.

EXAMPLE 1

An electrically conductive composition was prepared of a blended polymer mixture of low density polyethylene and ethylene vinyl acetate in a ratio of 5:1, containing 13% fine carbon, marketed as Shawinigan Black. The carbon was first blended with ethylene vinyl acetate and the low density polyethylene was then mixed into the first blend. The three component mixture was further blended at elevated temperature in a known manner, then extruded and annealed at 180° C. for 18 hours, and the annealed polymer was laminated over a copper foil to yield current collector sheets of 27 $\mu$m thickness. The resistivity switch temperature $T_{rs}$, of the above annealed polymeric mixture was found to be 98° C., about which the resistivity changed 2 orders of magnitude. The two-layer current collector was cut to rectangles of 62 mm×480 mm, and one face of a rectangle was coated in 0.2 mm thickness with a graphite containing anode mixture. The anode mixture was composed of graphite powder marketed as "Lonza SFG-15", and polyvinylidene fluoride binder added in 3 wt. %. A single layer of porous polypropylene separator, marketed under the name of "Celgard", and cut to the same size as the composite anode made of copper foil, electrically conducting polyethylene-ethylene vinyl acetate-carbon laminate and graphite layer, and was placed over the free face of the anode layer. The other side of the porous polypropylene separator was coated with a cathode mixture in 0.2 mm thickness, by the doctor's blade method. The cathode mixture contained lithium-cobalt oxide particles to which 3 wt. % polyvinylidene fluoride and 4 wt. % fine carbon had been added. The free face of the cathode layer was subsequently brought in contact with another rectangle of a two-layered current collector, which was made up of electrically conducting polyethylene-ethylene vinyl acetate-carbon polymer laminate and aluminum foil, having the aluminum foil on the external face. The assembled rechargeable lithium battery was wound, and then packaged into a plastic coated metallic cylinder of 65 mm length and 18 mm diameter, and subsequently filled with an electrolyte solution under vacuum and sealed. The electrolyte solution comprised ethylene carbonate-dimethyl carbonate in a ratio of 1:1 as solvent and contained $LiPF_6$ in 1 M concentration. The rechargeable lithium cell was charged to 4.2 volts. The cell showed an open circuit voltage of 4.08 V and had a capacity of 1540 mAh.

EXAMPLE 2

A wound rechargeable lithium cell made as described in Example 1, was subjected to a nail penetration test by driving a 0.5 mm diameter nail into the cell packaged in the metallic cylinder. The lithium cell exhibited an open cell voltage of 4.05 V prior the nail penetration and 1.86 V after the nail penetration test. It can be seen that the open circuit voltage of the cell has dropped but there was no explosion or fire as a consequence of the damage caused by the nail.

In a comparative test a similar cylindrical lithium cell was made up with the same electrodes and electrolyte, but neither of its electrodes has been equipped with an electrically conductive organic polymer current collector laminate. The cell exploded which led to a small fire as a consequence of the nail penetration test.

EXAMPLE 3

An electrically conductive composition was prepared of a polymer of polybutene-1 containing 12 wt. % Shawinigan Black, which had been blended at elevated temperature, then extruded and annealed for 5 hours at 155° C., and the annealed polymer was laminated over a copper foil to yield current collector sheets of 28 μm thickness. The resistivity switch temperature $T_{rs}$, of this polymer was 92° C. showing a resistivity change around this temperature of about 3 orders of magnitude. The two-layer current collector was cut to rectangles of 10 cm×12 cm, and one face of a rectangle was coated in 0.2 mm thickness with a graphite containing anode mixture. The anode mixture was composed of graphite powder marketed as "Lonza SFG-15", and polyvinylidene fluoride binder added in 3 wt. %. A composite cathode was prepared of lithium-cobalt oxide as the positive active component in the cathode layer as described in Example 1, and of a two-layered current collector made up of an electrically conductive polybutene-1 and carbon black laminate carried on an aluminum foil. A solid polymer electrolyte of polyethylene oxide containing $LiPF_6$ in 1 M concentration, cut to the same size as the composite anode and the composite cathode, was placed between the composite electrodes and the assembled lithium cell was packaged and sealed in the usual manner. The rechargeable lithium cell was charged at 4.2 volts and exhibited open circuit voltage of 4.05 V.

EXAMPLE 4

A planar rechargeable lithium cell made as described in Example 3, but having additionally a layer of polyvinylidene fluoride containing $LiPF_6$ in 0.6 M concentration, coated on each side of the solid polymer electrolyte before the electrolyte was placed between the appropriate electro-deactive layer bearing faces of the composite electrodes. The packaged lithium cell was charged as in Example 3 and showed similar open circuit voltages.

The particular advantage of a rechargeable lithium battery having a composite electrode bearing an electrically conductive organic polymer laminate, is that the latter is capable of protecting the lithium battery or the lithium electrochemical cell without affecting its efficiency. A lithium battery pack containing several rechargeable lithium cells thus can continue to deliver energy even if one of the cells has been rendered defective due to a local short circuit or hot spot.

The use of electrically conductive organic polymer layers in contact with a metallic current collector and combined with an electrode layer has been described with respect to rechargeable lithium batteries. However, such combinations of metallic and electrically conductive organic polymer laminate current collectors can be used in other electrochemical cells where protection from the consequences of local high current and high temperature is desirable.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

We claim:

1. In a rechargeable lithium battery having a negative electrode, a positive electrode, a metallic current collector adjacent each electrode and a non-aqueous electrolyte, the improvement comprising, that an organic polymer laminate having two opposing faces and rendered electrically conductive by embedded electrically conductive particles, is inserted between at least one of the electrodes and the adjacent metallic current collector, thereby forming a composite electrode including said positive or said negative electrode, comprising said electrically conductive organic polymer laminate having one face in contact with said metallic current collector and another face with said positive or said negative electrode, said electrically conductive organic polymer laminate having a thickness, said thickness and said opposing faces defining a total volume, said electrically conductive organic polymer laminate having a positive temperature coefficient of resistivity, a resistivity switch temperature Trs, between 75 and 120° C., said electrically conductive organic polymer laminate being capable of reversible resistivity change of at least 2 orders of magnitude within a 5° temperature band of said $T_{rs}$, and wherein said electrically conductive organic polymer is capable of having said reversible resistivity change in a portion of the total volume of said electrically conductive organic polymer laminate.

2. An improved rechargeable lithium battery as claimed in claim 1, wherein said positive or said negative electrode included in said composite electrode, is comprising a blended mixture of an electrode-active substance, carbon particles and a binder, and said blended mixture is applied as a coherent electrode layer.

3. An improved rechargeable lithium battery as claimed in claim 1, wherein said reversible resistivity change in said portion of the total volume of said electrically conductive organic polymer laminate is caused by a localized temperature change greater than 5° relative to the average temperature of said rechargeable lithium battery.

4. An improved rechargeable lithium battery as claimed in claim 1, wherein said volume portion of said electrically conductive organic polymer laminate is less than 50 vol. % of the total volume of said electrically conductive organic polymer laminate.

5. An improved rechargeable lithium battery as claimed in claim 1, wherein said resistivity switch temperature Trs is at least 50° below the melting temperature of said electrically conductive organic polymer laminate.

6. An improved rechargeable lithium battery as claimed in claim 1, wherein said electrically conductive particles are selected from the group consisting of fine carbon and carbon black and said electrically conductive particles have size less than 0.1 μm.

7. An improved rechargeable lithium battery as claimed in claim 1, wherein said electrically conductive organic polymer laminate has thickness between 4 and 50 μm.

8. An improved rechargeable lithium battery as claimed in claim 1, wherein said electrically conductive polymer laminate comprises at least one of the group consisting of polyethylene, copolymers of ethylene and ethyl acrylate, copolymers of ethylene and acrylic acid, polyolefins, polyethers, fluorinated ethylene-propylene copolymers, polyvinylidene fluoride, mixtures of polyethylene and a copolymer of ethylene and ethyl acrylate, and mixtures of polyethylene and a copolymer of ethylene and acrylic acid.

9. An improved rechargeable lithium battery as claimed in claim 8, wherein said electrically conductive polymer comprises electrically conductive particles selected from the group consisting of fine carbon, and carbon black in less than 15 vol. %.

10. An improved rechargeable lithium battery as claimed in claim 2, wherein said electrode-active substance is selected from the group consisting of a positive active substance and a negative active substance.

11. An improved rechargeable lithium battery as claimed in claim 1, wherein said composite electrode is a composite negative electrode and said negative electrode included in said composite negative electrode is a lithium metal or a lithium alloy foil.

12. An improved rechargeable lithium battery as claimed in claim 1, wherein said metallic current collector sheet has two opposing faces and each face is in contact with an electrically conductive organic polymer laminate.

13. An improved rechargeable lithium battery as claimed in claim 2, wherein said coherent electrode layer has opposing faces, one face of said coherent electrode layer being in contact with said electrically conductive organic polymer laminate, and the other face of said coherent electrode layer is bearing a lithium ion containing adhesive coating.

14. A rechargeable lithium battery comprising:
   i) a first metallic current collector;
   ii) a composite positive electrode comprising a first organic polymer laminate rendered electrically conductive by embedded electrically conductive particles, said first electrically conductive organic polymer laminate having a first thickness and a first pair of faces, said first thickness and said first pair of faces defining a first total volume, wherein said first electrically conductive organic polymer laminate has a positive temperature coefficient of resistivity, a resistivity switch temperature $T_{rs}$, between 75 and 120° C., said first electrically conductive organic polymer laminate being capable of reversible resistivity change of at least 2 orders of magnitude within a 5° temperature band of said $T_{rs}$, and wherein said first electrically conductive organic polymer is capable of having said reversible resistivity change in a portion of said first total volume of said first electrically conductive organic polymer laminate, one of said first pair of faces being in contact with said first metallic current collector, and the other of said first pair of faces of said first electrically conductive organic polymer laminate being in contact with a positive electrode further comprising a positive active substance, thereby forming a composite positive electrode including a positive electrode and a metallic current collector;
   iii) a non-aqueous lithium ion conducting electrolyte having a third pair of faces; and
   iv) a composite negative electrode comprising a second organic polymer laminate rendered electrically conductive by embedded electrically conductive particles, said second electrically conductive organic polymer laminate having a second thickness and a second pair of faces, said second thickness and said second pair of faces defining a second total volume, wherein said second electrically conductive organic polymer laminate has a positive temperature coefficient of resistivity, a resistivity switch temperature $T_{rs}$, between 75 and 120° C., said second electrically conductive organic polymer laminate being capable of reversible resistivity change of at least 2 orders of magnitude within a 5° temperature band of said $T_{rs}$, and wherein said second electrically conductive organic polymer is capable of having said reversible resistivity change in a portion of said second total volume of said second electrically conductive organic polymer laminate, one of said second pair of faces of said second electrically conductive organic polymer laminate being in contact with a negative electrode comprising a negative active substance, and the other of said second pair of faces is in contact with a second metallic current collector, thereby forming a composite negative electrode including a negative electrode and a second metallic current collector.

15. A rechargeable lithium battery as claimed in claim 14, wherein a lithium ion containing adhesive coating is inserted between said composite negative electrode comprising said negative active substance, and one of said third pair of faces of said non-aqueous lithium ion conducting electrolyte.

16. A rechargeable lithium battery as claimed in claim 14, wherein a lithium ion containing adhesive coating is inserted between said composite positive electrode comprising said positive active substance, and the other of said third pair of faces of said non-aqueous lithium ion conducting electrolyte.

17. A rechargeable lithium battery as claimed in claim 14, wherein said first and said second electrically conductive organic polymer laminates have the same compositions and the same resistivity switch temperatures $T_{rs}$.

* * * * *